(12) United States Patent
Sendo (10) Patent No.: US 12,544,702 B2
(45) Date of Patent: Feb. 10, 2026

(54) PILLAR-SHAPED HONEYCOMB STRUCTURE AND METHOD FOR MANUFACTURING SAME

(71) Applicant: NGK INSULATORS, LTD., Nagoya (JP)

(72) Inventor: Koichi Sendo, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 17/120,596

(22) Filed: Dec. 14, 2020

(65) Prior Publication Data

US 2021/0299603 A1   Sep. 30, 2021

(30) Foreign Application Priority Data

Mar. 26, 2020 (JP) ................................ 2020-056617
Dec. 4, 2020 (JP) ................................ 2020-201988

(51) Int. Cl.
*B01D 46/24* (2006.01)
*B01D 39/20* (2006.01)
(Continued)

(52) U.S. Cl.
CPC ..... *B01D 46/2429* (2013.01); *B01D 39/2079* (2013.01); *B01D 46/0001* (2013.01);
(Continued)

(58) Field of Classification Search
CPC ............ B01D 46/2429; B01D 46/0001; B01D 46/2444; B01D 46/24491; B01D 46/2498;
(Continued)

(56) References Cited

U.S. PATENT DOCUMENTS

2006/0188415 A1* 8/2006 Ohno .................. B01D 46/247
422/177
2011/0212831 A1 9/2011 Goto et al.
(Continued)

FOREIGN PATENT DOCUMENTS

DE   11 2019 007 100 T5   12/2021
JP       2000-020220 A1    1/2000
(Continued)

OTHER PUBLICATIONS

Lin Lin et al., Identifying facile and accurate methods to measure the thickness of the active layers of thin-film composite membranes—A comparison of seven characterization techniques, 2016, Journal of Membrane Science, 498, 167-179 (Year: 2016).*
(Continued)

*Primary Examiner* — Jennifer Dieterle
*Assistant Examiner* — Qianping He
(74) *Attorney, Agent, or Firm* — BURR PATENT LAW, PLLC (57) ABSTRACT

A pillar-shaped honeycomb structure filter including a plurality of first cells and a plurality of second cells, the first cells and the second cells being alternately arranged adjacent to each other with a porous partition wall interposed therebetween, wherein a ceramic porous film, in which an average film thickness T (unit: μm) is 2 to 50 μm, a porosity P (unit: %) is 65 to 90%, and the average film thickness T and the porosity P satisfy a relational expression of $0.36\ T+60 \leq P \leq 0.75\ T+72$, is formed on a surface of each of the first cells.

7 Claims, 5 Drawing Sheets

(51) Int. Cl.
*B01D 46/00* (2022.01)
*B01J 21/14* (2006.01)
*F01N 3/28* (2006.01)

(52) U.S. Cl.
CPC ... *B01D 46/24491* (2021.08); *B01D 46/2482* (2021.08); *B01D 46/2498* (2021.08); *B01D 46/2476* (2021.08); *B01D 2239/10* (2013.01); *B01D 2239/1208* (2013.01); *B01D 2239/1241* (2013.01); *B01D 2239/1291* (2013.01); *B01D 2279/30* (2013.01); *B01J 21/14* (2013.01); *F01N 3/2825* (2013.01); *F01N 2330/02* (2013.01); *F01N 2330/06* (2013.01); *F01N 2330/30* (2013.01); *F01N 2370/02* (2013.01)

(58) Field of Classification Search
CPC ............ B01D 39/2079; B01D 2239/10; B01D 2239/1208; B01D 2239/1241; B01D 2239/1291; B01D 2289/30; B01J 21/14; B01J 35/04; F01N 3/2825; F01N 2330/02; F01N 2330/06; F01N 2330/30; F01N 2370/02
USPC ........................................................ 55/523
See application file for complete search history.

(56) References Cited

U.S. PATENT DOCUMENTS

| | | | |
|---|---|---|---|
| 2012/0240542 A1* | 9/2012 | Kikuchi | C04B 38/0006 427/230 |
| 2015/0260067 A1* | 9/2015 | Kikuchi | B01D 46/0001 427/244 |
| 2019/0178126 A1* | 6/2019 | Nagai | B01D 46/24491 |
| 2020/0254435 A1 | 8/2020 | Wu et al. | |
| 2020/0353401 A1 | 11/2020 | Beall et al. | |
| 2021/0379523 A1 | 12/2021 | Nakashima et al. | |

FOREIGN PATENT DOCUMENTS

| | | |
|---|---|---|
| JP | 2001-079321 A1 | 3/2001 |
| JP | 2010-095399 A1 | 4/2010 |
| WO | 2019/089806 A1 | 5/2019 |

OTHER PUBLICATIONS

Japanese Office Action (Application No. 2020-201988) dated Apr. 20, 2021 (with English translation).
German Office Action (with English translation) dated Oct. 30, 2024 (Application No. 10 2020 007 934.2).

* cited by examiner

FIG. 1

Exhaust gas

PILLAR-SHAPED HONEYCOMB STRUCTURE AND METHOD FOR MANUFACTURING SAME

FIELD OF THE INVENTION

The present invention relates to a pillar-shaped honeycomb structure filter and a method for manufacturing the same.

BACKGROUND OF THE INVENTION

Particulate matter such as soot (hereinafter referred to as PM) is contained in the exhaust gas discharged from internal combustion engines such as a diesel engine and a gasoline engine. Soot is harmful to the human body and its emission is regulated. Currently, in order to comply with exhaust gas regulations, filters typified by DPF and GPF, in which exhaust gas is passed through breathable partition walls with small pores to filtrate PM such as soot, are widely used.

As a filter for collecting PM, there has been known a wall flow type pillar-shaped honeycomb structure (hereinafter, also referred to as "pillar-shaped honeycomb structure filter") comprising a plurality of first cells extending in a height direction from an inlet side end surface to an outlet side end surface, opening on the inlet side end surface and having a sealing portion on the outlet side end surface, and a plurality of second cells arranged adjacent to the first cells with a partition wall interposed therebetween, extending in the height direction from the inlet side end surface to the outlet side end surface, having a sealing portion on the inlet side end surface and opening on the outlet side end surface.

In recent years, with the tightening of exhaust gas regulations, stricter PM emission standards (PN regulation: particulate number regulation) have been introduced, and filters are required to have high PM collection performance (high PN collection efficiency). Accordingly, it has been proposed to additionally form a layer for collecting PM on the surface of the cells.

Patent Literature 1 discloses a method for manufacturing a honeycomb filter for dust collection in which at least one layer of a porous film having a smaller pore diameter than a honeycomb-shaped porous substrate is formed on a surface of the porous substrate, the method comprising providing the inside of the cells of the porous substrate with a slurry prepared from aggregate particles having a 50% particle size ($D_{50}$: μm) of ⅔-fold or more and 1-fold or less of an average pore size (P: μm) of the porous substrate and a particle size distribution in the range of the following formula (1); forming a film by removing the moisture in the slurry through the pores of the porous substrate; and then performing firing.

$$D_{50}/(D_{50}-D_{10}) \geq 1.5 \quad (1)$$

(wherein, $D_{50}$: 50% particle size (μm), $D_{10}$: 10% particle size (μm))

Further, Patent Literature 1 discloses a honeycomb filter for dust collection in which at least one layer of a porous film having a smaller pore diameter than a honeycomb-shaped porous substrate was formed on a surface of the porous substrate, wherein a first layer of the porous film is composed of aggregate particles having a 50% particle size ($D_{50}$: μm) of ⅔-fold or more and 1-fold or less of an average pore size (P: μm) of the porous substrate and a particle size distribution in the range of the following formula (1), and an average film thickness is 3-fold or more of the 50% particle size.

$$D_{50}/(D_{50}-D_{10}) \geq 1.5 \quad (1)$$

(wherein, $D_{50}$: 50% particle size (μm), $D_{10}$: 10% particle size (μm))

According to Patent Literature 1, by forming a film using a slurry prepared from aggregate particles having an average particle size and particle size distribution within predetermined ranges, a honeycomb filter having a high collection efficiency and a low-pressure loss can be easily manufactured with a simple apparatus, and moreover, a large number of filters can be manufactured with uniform quality.

Patent Literature 2 discloses a method for manufacturing a multilayer structure honeycomb filter, comprising providing each cell of a substrate having a honeycomb structure with a slurry of ceramic particles having an average particle size of ⅔-fold or more and 1-fold or less of an average pore diameter of the substrate; removing the moisture in the slurry through the pores of the substrate to adhere the ceramic particles to a surface of the substrate; and then performing firing to form a coat layer on the surface of the substrate.

Further, Patent Literature 2 discloses a multilayer structure honeycomb filter for dust collection in which one or more layers of a coat layer composed of ceramic particles having an average particle size different from ceramic particles constituting a substrate having a honeycomb structure are provided on a surface of the substrate; wherein the average particle size of the coat layer in contact with the substrate is ⅔-fold or more and 1-fold or less of an average pore diameter of the substrate, and an average thickness of the coat layer in contact with the substrate is 7-fold or less of the average particle size of the coat layer.

According to Patent Literature 2, this multilayer structure honeycomb filter has a high collection efficiency, a low-pressure loss, and a reduced pressure-loss increase rate.

Patent Literature 3 discloses forming a porous layer having a porosity of 90% or more and an average thickness of 0.5 μm to 30 μm. Patent Literature 3 discloses that the high porosity of the porous layer eliminates the influence on the pressure loss of the honeycomb structure.

CITATION LIST

Patent Literature

[Patent Literature 1] Japanese Patent Application Publication No. 2001-79321
[Patent Literature 2] Japanese Patent Application Publication No. 2000-20220
[Patent Literature 3] WO 2019/089806

SUMMARY OF THE INVENTION

It is considered effective to form a layer for collecting PM on the surface of the cells in order to achieve both a high PN collection efficiency and a low-pressure loss in the pillar-shaped honeycomb structure filter. However, there is still room for improvement of such a layer, and if any improvement can be made in such a layer from a different perspective than before, it will be advantageous because technical options will increase, and it also helps to expand the possibilities of further research in the future.

Therefore, in one embodiment of the present invention, an object is to provide a pillar-shaped honeycomb structure filter that contributes to both a high PN collection efficiency and a low-pressure loss from a different perspective than before. Further, in another embodiment, an object is to provide a method for manufacturing such a pillar-shaped honeycomb structure filter.

As a result of diligent studies to achieve the above objects the present inventor has found that, with respect to the layer for collecting PM on the surface of the cells (referred to as "porous film" in the present invention), it is effective that the average film thickness and the porosity have a certain relationship in improving the PN collection efficiency while maintaining a low-pressure loss. The present invention has been completed based on the above findings, and is exemplified as below.

[1]
A pillar-shaped honeycomb structure filter, comprising:
a plurality of first cells extending from an inlet side end surface to an outlet side end surface, opening on the inlet side end surface and having a sealing portion on the outlet side end surface; and
a plurality of second cells extending from the inlet side end surface to the outlet side end surface, having a sealing portion on the inlet side end surface and opening on the outlet side end surface, the first cells and the second cells being alternately arranged adjacent to each other with a porous partition wall interposed therebetween;
wherein a ceramic porous film, in which an average film thickness T (unit: μm) is 2 to 50 μm, a porosity P (unit: %) is 65 to 90%, and the average film thickness T and the porosity P satisfy a relational expression of 0.36 T+60≤P≤0.75 T+72, is formed on a surface of each of the first cells.

[2]
The pillar-shaped honeycomb structure filter according to [1], wherein the porous film has the average film thickness T (unit: μm) of 2 to 40 μm and the porosity P (unit: %) of 65 to 90%.

[3]
The pillar-shaped honeycomb structure filter according to [1] or [2], wherein the porous film comprises 50% by mass or more in total of one or more selected from silicon carbide, cordierite, alumina, silica, mullite and aluminum titanate.

[4]
The pillar-shaped honeycomb structure filter according to any one of [1] to [3], wherein the porous partition walls comprise 50% by mass or more of cordierite.

[5]
A method for manufacturing a pillar-shaped honeycomb structure filter, comprising:
a step of preparing a pillar-shaped honeycomb structure comprising a plurality of first cells extending from an inlet side end surface to an outlet side end surface, opening on the inlet side end surface and having a sealing portion on the outlet side end surface, and a plurality of second cells extending from the inlet side end surface to the outlet side end surface, having a sealing portion on the inlet side end surface and opening on the outlet side end surface, the first cells and the cells being alternately arranged adjacent to each other with a porous partition wall interposed therebetween;
a step of adhering ceramic particles to a surface of the first cells by injecting an aerosol containing the ceramic particles toward the inlet side end surface while applying a suction force to the outlet side end surface to suck the injected aerosol from the inlet side end surface, the ceramic particles satisfying 0.1≤D50≤6.0 and a relational expression of 0.4≤D50/(D90−D10), wherein D50 (unit: μm) is a median diameter, D10 (unit: μm) is a 10% diameter, and D90 (unit: μm) is a 90% diameter in a volume-based cumulative particle size distribution measured by a laser diffraction/scattering method; and
a step of forming a porous film on the surface of the first cells by heat-treating the pillar-shaped honeycomb structure in which the ceramic particles are adhered to the surface of the first cells at a maximum temperature of 1000° C. or higher for 1 hour or more so that an average film thickness T and D50 satisfy a relational expression of 4×D50≤T≤20×D50.

[6]
The method for manufacturing a pillar-shaped honeycomb structure filter according to [5], wherein the porous film comprises 50% by mass or more in total of one or more selected from silicon carbide, cordierite, alumina, silica, mullite and aluminum titanate.

[7]
The method for manufacturing a pillar-shaped honeycomb structure filter according to [5] or [6], wherein the porous partition walls comprise 50% by mass or more of cordierite.

[8]
The method for manufacturing a pillar-shaped honeycomb structure filter according to any one of [5] to [7], wherein the porous film has the average film thickness of 2 to 50 μm.

The pillar-shaped honeycomb structure filter according to one embodiment of the present invention can contribute to both a high PN collection efficiency and a low-pressure loss.

BRIEF DESCRIPTION OF THE DRAWINGS

FIG. 1 is a perspective view schematically showing one example of a pillar-shaped honeycomb structure filter.

FIG. 2 is a schematic cross-sectional view when one example of a pillar-shaped honeycomb structure filter is observed in a cross-section parallel to the direction in which the cells extend.

FIG. 3 is a schematic partially enlarged view of a pillar-shaped honeycomb structure filter observed in a cross-section orthogonal to the direction in which the cells extend.

FIG. 4 is a schematic view of a cross-section of a pillar-shaped honeycomb structure filter cut out in order to measure the average thickness of the porous film.

FIG. 5 is a schematic view for illustrating the configuration of a particle adhering device according to one embodiment of the present invention.

FIG. 6 is a graph showing the relationship between the average film thickness and the porosity of the porous film in Examples and Comparative Examples.

FIG. 7 is a graph showing the relationship between the median diameter (D50) of the ceramic particles in the aerosol and the average film thickness of the porous film in Examples and Comparative Examples.

FIG. 8 is an example of an FE-SEM image of the porous film in Example 2.

DETAILED DESCRIPTION OF THE INVENTION

Hereinafter, embodiments of the present invention will be described in detail with reference to the drawings. It should be understood that the present invention is not limited to the following embodiments, and any change, improvement or the like of the design may be appropriately added based on ordinary knowledge of those skilled in the art without departing from the spirit of the present invention.

<1. Pillar-Shaped Honeycomb Structure Filter>

A pillar-shaped honeycomb structure filter according to one embodiment of the present invention will be described. The pillar-shaped honeycomb structure filter can be used as a DPF (Diesel Particulate Filter) and a GPF (Gasoline Particulate Filter) that collect soot installed in an exhaust gas line from a combustion device, typically an engine mounted on a vehicle. The pillar-shaped honeycomb structure filter according to the present invention can be installed in an exhaust pipe, for example.

Figure 1:
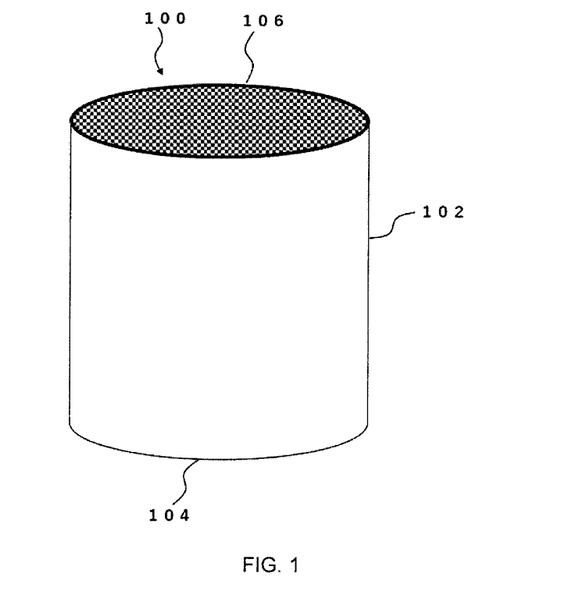
Figure 2:
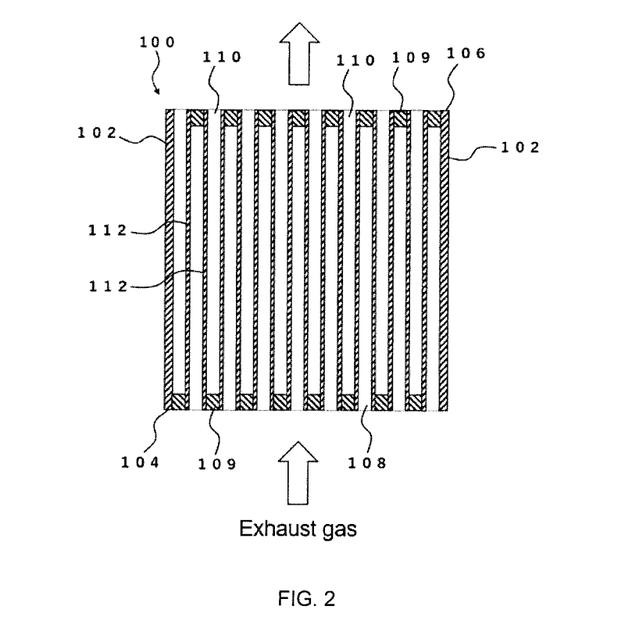

FIGS. 1 and 2 illustrate a schematic perspective view and a cross-sectional view of a pillar-shaped honeycomb structure filter (100), respectively. This pillar-shaped honeycomb structure filter (100) comprises an outer peripheral side wall (102), and a plurality of first cells (108) provided on the inner peripheral side of the outer peripheral side wall (102), the first cells (108) extending from an inlet side end surface (104) to an outlet side end surface (106), opening on the inlet side end surface (104) and having a sealing portion (109) on the outlet side end surface (106), and a plurality of second cells (110) provided on the inner peripheral side of the outer peripheral side wall (102), the second cells (110) extending from the inlet side end surface (104) to the outlet side end surface (106), having a sealing portion (109) on the inlet side end surface (104) and opening on the outlet side end surface (106). In this pillar-shaped honeycomb structure (100), since the first cells (108) and the second cells (110) are alternately arranged adjacent to each other with the porous partition wall (112) interposed therebetween, the inlet side end surface (104) and the outlet side end surface (106) each have a honeycomb shape.

When the exhaust gas containing particulate matter (PM) such as soot is supplied to the inlet side end surface (104) which is on the upstream side of the pillar-shaped honeycomb structure filter (100), the exhaust gas is introduced into the first cells (108) and proceeds downstream in the first cells (108). Since the first cells (108) have the sealing portion (109) on the outlet side end surface (106) on the downstream side, the exhaust gas penetrates through the porous partition walls (112) partitioning the first cells (108) and the second cells (110) and flows into the second cells (110). Since particulate matter cannot penetrate the partition walls (112), it is collected and deposited in the first cells (108). After the particulate matter is removed, the clean exhaust gas that has flowed into the second cells (110) proceeds downstream in the second cells (110) and flows out of the outlet side end surface (106) on the downstream side.

Figure 3:
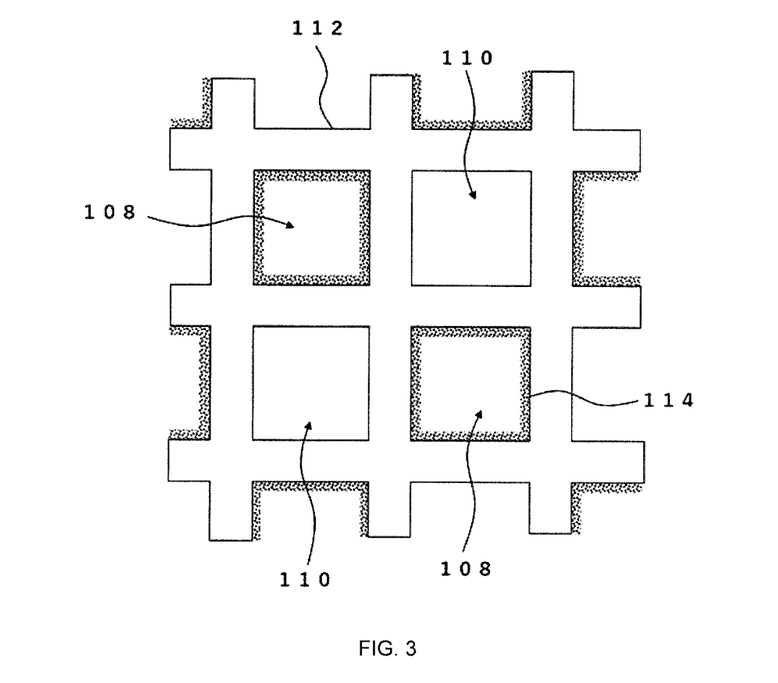

FIG. 3 shows a schematic partially enlarged view when the pillar-shaped honeycomb structure filter (100) is observed in a cross-section orthogonal to the direction in which the cells (108, 110) extend. The surface of each of the first cells (108) of the pillar-shaped honeycomb structure filter (100) (the same as the surface of the partition walls (112) partitioning the first cells (108)) is covered with porous films (114) made of ceramics.

The porous film may contain one or more ceramics selected from silicon carbide (SiC), cordierite, talc, mica, mullite, potsherd, aluminum titanate, alumina, silicon nitride, sialon, zirconium phosphate, zirconia, titania and silica ($SiO_2$). Among these, for reasons of cost, availability, thermal shock resistance, and peel resistance, the porous film preferably contains 50% by mass or more, more preferably 70% by mass or more, and even more preferably 90% by mass or more in total of one or more selected from silicon carbide, cordierite, alumina, silica, mullite and aluminum titanate. For the reason of peel resistance, the porous film preferably contains 50% by mass or more, more preferably 70% by mass or more, and even more preferably 90% by mass or more of silicon carbide.

In one embodiment, the average film thickness of the porous film is 2 to 50 μm. When the average film thickness of the porous film is 2 μm or more, preferably 3 μm or more, there is an advantage that the collection efficiency can be improved. Further, when the average film thickness of the porous film is 50 μm or less, preferably 40 μm or less, more preferably 30 μm or less, and even more preferably 20 μm or less, there is an advantage that an increase in pressure loss can be suppressed.

In the present specification, the average film thickness of the porous film of the pillar-shaped honeycomb structure filter is measured by the following procedures. The direction in which the first cells of the pillar-shaped honeycomb structure filter extend is set as the extending direction of a coordinate axis, and the coordinate value of the inlet side end surface is set to 0, and the coordinate value of the outlet side end surface it set to X. Next, the average thickness of the porous film is measured in 5 field of views at each of the following 6 locations, $A_1$, $A_2$, $A_3$, $B_1$, $B_2$, and $B_3$, and the average value of all of these averages is taken as the average film thickness of the porous film of the pillar-shaped honeycomb structure.

$A_1$: The central portion in the range of coordinate values 0.1X to 0.3X in a cross-section orthogonal to the direction in which the first cells of the pillar-shaped honeycomb structure filter extend.

$B_1$: The outer peripheral portion in the range of coordinate values 0.1X to 0.3X in a cross-section orthogonal to the direction in which the first cells of the pillar-shaped honeycomb structure filter extend.

$A_2$: The central portion in the range of coordinate values 0.4X to 0.6X in a cross-section orthogonal to the direction in which the first cells of the pillar-shaped honeycomb structure filter extend.

$B_2$: The outer peripheral portion in the range of coordinate values 0.4X to 0.6X in a cross-section orthogonal to the direction in which the first cells of the pillar-shaped honeycomb structure filter extend.

$A_3$: The central portion in the range of coordinate values 0.7X to 0.9X in a cross-section orthogonal to the direction in which the first cells of the pillar-shaped honeycomb structure filter extend.

$B_3$: The outer peripheral portion in the range of coordinate values 0.7X to 0.9X in a cross-section orthogonal to the direction in which the first cells of the pillar-shaped honeycomb structure filter extend.

The central portion and the outer peripheral portion of the pillar-shaped honeycomb structure filter when measuring the average thickness of the porous film are determined as follows. When the pillar-shaped honeycomb structure filter is observed from the cross-section orthogonal to the direction in which the first cells extend, a line segment is drawn from the center of gravity of the cross-section toward the outer surface of the outer peripheral side wall, the extending direction of the line segment is set as the extending direction of a coordinate axis, and the coordinate value of the center of gravity is set to 0, and the coordinate value of the outer surface of the outer peripheral side wall is set to R. In this case, in the line segment, the range of the coordinate values 0 to 0.2 R is the central portion, and the range of the coordinate values 0.7 R to 0.9 R is the outer peripheral portion. By drawing a large number of such line segments in the cross-section and gathering the central portion and the outer peripheral portion of each line segment, the range of the central portion and the outer peripheral portion in the cross-section can be obtained.

The average thickness of the porous film at each location of $A_1$, $A_2$, $A_3$, $B_1$, $B_2$, and $B_3$ is measured by the following method. A cross-section, which is parallel to the direction in which the first cells extend and parallel to the line segment from the outer surface of the outer peripheral side wall toward the center of gravity, is cut out from a location (central portion or outer peripheral portion) where the average thickness of the porous film of the pillar-shaped honeycomb structure filter is to be determined. The cross-section is observed with a 3D shape measuring machine (for example, VR-3200 available from KEYENCE CORPORATION) under the conditions of a magnification of 25 times and an observation field of view of 12.5 mm (horizontal)× 9.5 mm (vertical). At this time, the observation is performed such that the horizontal direction of the observation field of view is parallel to the direction in which the first cells extend.

Figure 4:
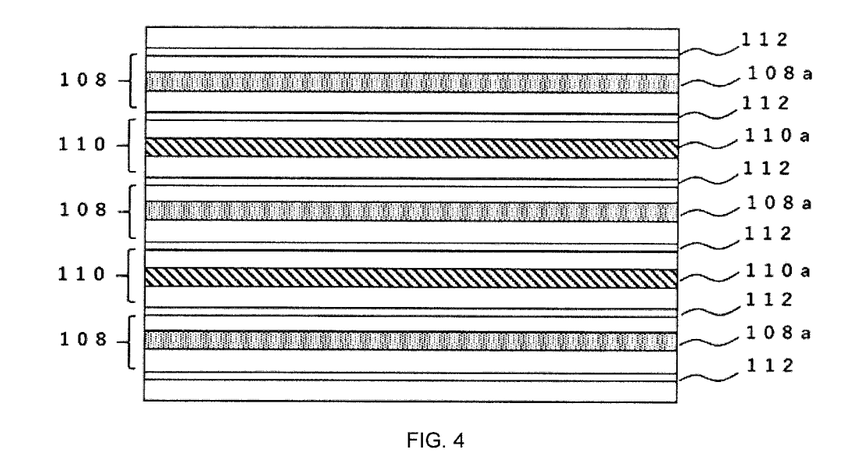

FIG. 4 shows a schematic view of a cut-out cross-section. By cross-sectional observation, the first cells (108) in which a porous film is formed and the second cells (110) in which a porous film is not formed are identified. Next, three first cells (108) adjacent to each other at the position closest to the center on the cross-section are identified. In addition, the central regions (110a) (reference planes) of the two second cells (110) sandwiched between the three adjacent first cells (108) at the position closest to the center on the cross-section are identified, and leveling is performed with image processing software (for example, software attached to the 3D shape measuring machine VR-3200 available from KEYENCE CORPORATION) so that the reference planes are the most horizontal based on the profiles of these two regions. After the leveling, the areas of the central regions (110a) of the two second cells (110) are designated, and the average height H2 of the regions is measured. Further, after the leveling, the areas of the central regions (108a) of the three first cells (108) are designated, and the average height H1 of the regions is measured. The difference between the average height H1 and the average height H2 in one field of view is defined as the average thickness of the porous film in this field of view. The central regions (108a, 110a) refer to an area at the center part when the distance between a pair of partition walls (112) partitioning each cell is divided into three equal parts.

For each location of $A_1$, $A_2$, $A_3$, $B_1$, $B_2$, and $B_3$, the average thickness of the porous film of 5 arbitrary field of views is determined, and the average is taken as the average thickness of the porous film at each location of $A_1$, $A_2$, $A_3$, $B_1$, $B_2$, and $B_3$. Then, the average value of all of these averages is taken as the average film thickness of the porous film of the pillar-shaped honeycomb structure filter.

In one embodiment, the porosity of the porous film is 65 to 90%. Controlling the porosity of the porous film within this range in combination with the above-mentioned average film thickness of the porous film is effective in achieving both a high PN collection efficiency and a low-pressure loss. From the viewpoint of suppressing an increase in pressure loss, the porosity of the porous film is preferably 65% or more, more preferably 68% or more. Further, from the viewpoint of obtaining a high PN collection efficiency, the porosity of the porous film is preferably 90% or less, more preferably 85% or less, and even more preferably 80% or less.

As to the porosity of the porous film, for each cross-section at each location of $A_1$, $A_2$, $A_3$, $B_1$, $B_2$, and $B_3$ in which the average thickness of the porous film is determined, in-lens backscattered electron images of the central region (108a) of the first cells (108) in which the porous film is formed are captured at 2 arbitrary fields of view using a Field Emission Scanning Electron Microscope (abbreviation: FE-SEM) (for example, model: ULTRA55 available from ZEISS). Next, the image is binarized by the mode method using image analysis software (for example, HALCON), divided into a film material portion and a void portion, and the ratio of the film material portion and the void portion is calculated and the porosity of the porous film at each location of $A_1$, $A_2$, $A_3$, $B_1$, $B_2$, and $B_3$ is measured. Then, the average value of all of these averages is taken as the porosity of the porous film of the pillar-shaped honeycomb structure filter.

In order to achieve both high PN collection efficiency and low pressure loss, in addition to controlling the average film thickness and porosity within the above-mentioned ranges, the porous film preferably has the average film thickness T (unit: μm) and the porosity P (unit:%) satisfying the relational expression of 0.36 T+60≤P≤0.75 T+72, and more preferably satisfying the relational expression of 0.42 T+67≤P≤0.75 T+68.

Examples of the material constituting the porous partition walls and the outer peripheral side wall of the pillar-shaped honeycomb structure filter according to the present embodiment include, but are not limited to, porous ceramics. Examples of ceramics include cordierite, mullite, zirconium phosphate, aluminum titanate, silicon carbide (SiC), silicon-silicon carbide composite (for example, Si-bonded SiC), cordierite-silicon carbide composite, zircon, zirconia, spinel, indialite, sapphirine, corundum, titania, silicon nitride, and the like. As the ceramics, one type may be contained alone, or two or more types may be contained at the same time. In the case of filter applications such as DPF and GPF, cordierite can be preferably used as the ceramics. Therefore, the porous partition walls and the outer peripheral side wall preferably contain 50% by mass or more of cordierite, more preferably 70% by mass or more, and even more preferably 90% by mass or more of cordierite.

The pillar-shaped honeycomb structure filter may carry a PM combustion catalyst that assists PM combustion such as soot, an oxidation catalyst (DOC), a SCR catalyst and an NSR catalyst for removing nitrogen oxides (NOx), and a three-way catalyst that can remove hydrocarbon (HC), carbon monoxide (CO) and nitrogen oxides (NOx) at the same time. However, it is preferable that the pillar-shaped honeycomb structure filter according to the present embodiment should not carry a catalyst. This is due to the increase in the pressure loss.

The end surface shape of the pillar-shaped honeycomb structure filter is not limited, and may be, for example, a round shape such as a circle, an ellipse, a race track shape, or an oval shape, or a polygon such as a triangle or a quadrangle. The pillar-shaped honeycomb structure (100) of FIG. 1 has a circular end surface and is cylindrical as a whole.

The shape of the cells in the cross-section perpendicular to the flow path direction of the cells is not limited, but is preferably a quadrangle, a hexagon, an octagon, or a combination thereof. Among these, squares and hexagons are preferred. By making the shape of the cells in this way, it is possible to reduce the pressure loss when a fluid passes through the pillar-shaped honeycomb structure.

The average pore diameter of the partition walls is preferably 20 μm or less, more preferably 18 μm or less, and even more preferably 16 μm or less. When the average pore diameter of the partition walls is in the above range, the collection efficiency of particulate matter is significantly improved. In addition, the average pore diameter of the partition walls is preferably 4 μm or more, more preferably 6 μm or more, and even more preferably 8 μm or more. When the average pore diameter of the partition walls is in the above range, it is possible to suppress the pressure loss decrease. The average pore size of the partition walls refers to the value measured with a mercury intrusion porosimeter in accordance with JIS-R1655: 2003.

The porosity of the partition walls is preferably 40% or more, more preferably 45% or more, and even more preferably 50% or more, from the viewpoint of suppressing the pressure loss of the exhaust gas. Further, the porosity of the partition walls is preferably 80% or less, more preferably 75% or less, and even more preferably 70% or less, from the viewpoint of ensuring the strength of the pillar-shaped honeycomb structure filter. The porosity of the partition walls refers to the value measured with a mercury intrusion porosimeter in accordance with JIS-R1655: 2003.

The upper limit of the average thickness of the partition walls in the pillar-shaped honeycomb structure filter is preferably 0.59 mm or less, more preferably 0.33 mm or less, and even more preferably 0.26 mm or less, from the viewpoint of suppressing the pressure loss. However, from the viewpoint of ensuring the strength of the pillar-shaped honeycomb structure filter, the lower limit of the average thickness of the partition walls is preferably 0.15 mm or more, more preferably 0.16 mm or more, and even more preferably 0.18 mm or more. In the present specification, the thickness of the partition walls refers to the length of a line segment that crosses the partition wall when the centers of gravity of adjacent cells are connected by this line segment in a cross-section orthogonal to the flow path of the cells. The average thickness of partition walls refers to the average value of the thickness of all partition walls.

The cell density (the number of cells per unit cross-sectional area perpendicular to the direction in which the cell extend) is not particularly limited, but may be, for example, 6 to 2000 cells/square inch (0.9 to 311 cells/cm$^2$), more preferably 50 to 1000 cells/square inch (7.8 to 155 cells/cm$^2$), particularly preferably 100 to 400 cells/square inch (15.5 to 62.0 cells/cm$^2$).

The pillar-shaped honeycomb structure filter can also be provided as an integrally formed product. Further, the pillar-shaped honeycomb structure filter can also be provided as a segment joint body by joining and integrating segments of a plurality of pillar-shaped honeycomb structure filters, each having an outer peripheral side wall, with each other on the side surfaces. By providing the pillar-shaped honeycomb structure filter as a segment joint body, the thermal shock resistance can be enhanced.

<2. Method for Manufacturing Pillar-Shaped Honeycomb Structure Filter>

A method for manufacturing a pillar-shaped honeycomb structure filter will be exemplified as below. First, a green body is formed by kneading a raw material composition comprising a ceramic raw material, a dispersion medium, a pore-forming material, and a binder. Next, the green body is extruded to form a honeycomb formed body as desired. Additives such as a dispersant can be added to the raw material composition as needed. For extrusion, a die having a desired overall shape, cell shape, partition wall thickness, cell density and the like can be used.

After the pillar-shaped honeycomb formed body is dried, sealing portions are formed at predetermined positions on both end surfaces of the pillar-shaped honeycomb formed body, and then the sealing portions are dried to obtain a pillar-shaped honeycomb formed body having the sealing portions. After that, by degreasing and firing the pillar-shaped honeycomb formed body, a pillar-shaped honeycomb structure is manufactured.

As the ceramic raw material, a raw material capable of forming the above-mentioned ceramics after firing can be used. The ceramic raw material can be provided, for example, in the form of powder. Examples of the ceramic raw material include a raw material for obtaining ceramics such as cordierite, mullite, zirconium phosphate, aluminum titanate, silicon carbide (SiC), silicon-silicon carbide composite (for example, Si-bonded SiC), cordierite-silicon carbide composite, zircon, zirconia, spinel, indialite, sapphirine, corundum, titania, silicon nitride, and the like. Specific examples thereof include, but are not limited to, silica, talc, alumina, kaolin, serpentine, pyrophyllite, brucite, boehmite, mullite, magnesite, and aluminum hydroxide. As the ceramic raw material, one type may be used alone, or two or more types may be used in combination.

In the case of filter applications such as DPF and GPF, cordierite can be preferably used as the ceramics. In this case, a cordierite-forming raw material can be used as the ceramic raw material. The cordierite-forming raw material is a raw material that becomes cordierite by firing. It is desirable that the cordierite-forming raw material have a chemical composition of alumina ($Al_2O_3$) (including the amount of aluminum hydroxide that converts to alumina): 30 to 45% by mass, magnesia (MgO): 11 to 17% by mass, and silica ($SiO_2$): 42 to 57% by mass.

Examples of the dispersion medium include water or a mixed solvent of water and an organic solvent such as alcohol, and water can be particularly preferably used.

The pore-forming material is not particularly limited as long as it forms pores after firing, and examples thereof include, wheat flour, starch, foamed resin, water-absorbing resin, porous silica, carbon (for example, graphite), ceramic balloon, polyethylene, polystyrene, polypropylene, nylon, polyester, acrylic and phenol, and the like. As the pore-forming material, one type may be used alone, or two or more types may be used in combination. From the viewpoint of increasing the porosity of the fired body, the amount of the pore-forming material is preferably 0.5 parts by mass or more, more preferably 2 parts by mass or more, and even more preferably 3 parts by mass or more with respect to 100 parts by mass of the ceramic raw material. From the viewpoint of ensuring the strength of the fired body, the amount of the pore-forming material is preferably 10 parts by mass or less, more preferably 7 parts by mass or less, and even more preferably 4 parts by mass or less with respect to 100 parts by mass of the ceramic raw material.

Examples of the binder include organic binders such as methyl cellulose, hydroxypropyl methyl cellulose, hydroxyethyl cellulose, carboxymethyl cellulose, and polyvinyl alcohol. In particular, it is preferable to use methyl cellulose and hydroxypropyl methyl cellulose in combination. Further, from the viewpoint of increasing the strength of the honeycomb formed body, the amount of the binder is preferably 4 parts by mass or more, more preferably 5 parts by mass or more, and even more preferably 6 parts by mass or more with respect to 100 parts by mass of the ceramic raw material. From the viewpoint of suppressing the occurrence of crack due to abnormal heat generation in the firing process, the amount of the binder is preferably 9 parts by mass or less, more preferably 8 parts by mass or less, and even more preferably 7 parts by mass or less with respect to 100 parts by mass of the ceramic raw material. As the binder, one type may be used alone, or two or more types may be used in combination.

As the dispersant, ethylene glycol, dextrin, fatty acid soap, polyether polyol and the like can be used. As the dispersant, one type may be used alone, or two or more types may be used in combination. The content of the dispersant is preferably 0 to 2 parts by mass with respect to 100 parts by mass of the ceramic raw material.

The method for sealing the end surfaces of the pillar-shaped honeycomb formed body is not particularly limited, and a well-known method can be adopted. The material of the sealing portion is not particularly limited, but ceramics are preferable from the viewpoint of strength and heat resistance. As the ceramics, it is preferably a ceramic material comprising at least one selected from the group consisting of cordierite, mullite, zircon, zirconium phosphate, aluminum titanate, silicon carbide, silicon nitride, zirconia, spinel, indialite, sapphirine, corundum, and titania. It is even more preferable that the sealing portion has the same material composition as the partition walls of the honeycomb formed body because the expansion coefficient at the time of firing can be the same so that the durability is improved.

After drying the honeycomb formed body, a pillar-shaped honeycomb structure can be manufactured by performing degreasing and firing. As for the conditions of the drying process, the degreasing process, and the firing process, known conditions may be adopted according to the material composition of the honeycomb formed body, and no particular explanation is required. However, specific examples of the conditions are given below.

In the drying process, conventionally known drying methods such as hot air drying, microwave drying, dielectric drying, decompression drying, vacuum drying, and freeze drying can be used. Among these, a drying method that combines hot air drying with microwave drying or dielectric drying is preferable in that the entire formed body can be dried quickly and uniformly.

When forming the sealing portions, it is preferable to form the sealing portions on both end surfaces of the dried honeycomb formed body and then dry the sealing portions. The sealing portions are formed at predetermined positions so that a plurality of first cells extending from the inlet side end surface to the outlet side end surface, opening on the inlet side end surface and having a sealing portion on the outlet side end surface, and a plurality of second cells extending from the inlet side end surface to the outlet side end surface, having a sealing portion on the inlet side end surface and opening on the outlet side end surface, are alternately arranged adjacent to each other with the porous partition wall interposed therebetween.

Next, the degreasing process will be described. The combustion temperature of the binder is about 200° C., and the combustion temperature of the pore-forming material is about 300 to 1000° C. Therefore, the degreasing process may be carried out by heating the honeycomb formed body in the range of about 200 to 1000° C. The heating time is not particularly limited, but is normally about 10 to 100 hours. The honeycomb formed body after the degreasing step is called a calcined body.

The firing process depends on the material composition of the honeycomb formed body, but can be performed, for example, by heating the calcined body to 1350 to 1600° C. and holding it for 3 to 10 hours. In this way, a pillar-shaped honeycomb structure comprising a plurality of first cells extending from the inlet side end surface to the outlet side end surface, opening on the inlet side end surface and having a sealing portion on the outlet side end surface, and a plurality of second cells extending from the inlet side end surface to the outlet side end surface, having a sealing portion on the inlet side end surface and opening on the outlet side end surface, the first cells and the second cells being alternately arranged adjacent to each other with the porous partition wall interposed therebetween can be prepared.

Next, a porous film is formed on the surface of the first cells of the pillar-shaped honeycomb structure that has undergone the firing step. First, a step of adhering ceramic particles to the surface of the first cells by injecting an aerosol containing the ceramic particles toward the inlet side end surface while applying a suction force to the outlet side end surface to suck the injected aerosol from the inlet side end surface is carried out.

At this time, it is desirable that the ceramic particles in the aerosol have a sharp and fine particle size distribution. If the ceramic particles in the aerosol have a sharp and fine particle size distribution, the obtained porous film can have a homogeneous three-dimensional structure with fine pores, and it becomes easy to obtain a high PN collection efficiency even if the film thickness is thin. By making the film thickness thinner, it is possible to achieve a low-pressure loss. It is difficult to accurately identify this homogeneous three-dimensional structure with fine pores, but at least it is partially apparent as a low porosity.

Specifically, the ceramic particles in the aerosol preferably satisfy $0.1 \leq D50 \leq 6.0$ and a relational expression of $0.4 \leq D50/(D90-D10)$, wherein D50 (unit: μm) is a median diameter, D10 (unit: μm) is a 10% diameter, and D90 (unit: μm) is a 90% diameter in a volume-based cumulative particle size distribution measured by a laser diffraction/scattering method.

The upper limit of D50 of the ceramic particles is preferably 6.0 μm or less, more preferably 4.0 μm or less, and even more preferably 3.0 μm or less. The lower limit of D50 of the ceramic particles is not particularly limited, but from the viewpoint of ease of preparation, it is usually 0.1 μm or more, preferably 0.5 μm or more, and more preferably 1.0 μm or more.

A sharp particle size distribution can be represented by $D50/(D90-D10)$. By using $D50/(D90-D10)$ as an index, it is possible to express the degree of aggregation of ceramic particles in particular. $D50/(D50-D10)$ as defined in Patent Literature 1 cannot represent how sharp the particle size distribution is. A large $D50/(D90-D10)$ means that the particle size distribution is sharp. Specifically, $0.4 \leq D50/(D90-D10)$ is preferable, $0.6 \leq D50/(D90-D10)$ is more preferable, and $0.8 \leq D50/(D90-D10)$ is even more preferable, $1.0 \leq D50/(D90-D10)$ is even more preferable, and for example, $0.4 \leq D50/(D90-D10) \leq 1.5$ can be adopted.

As the ceramic particles, the above-mentioned ceramic particles constituting the porous film are used. Specifically, one or more ceramics selected from silicon carbide (SiC), cordierite, talc, mica, mullite, potsherd, aluminum titanate, alumina, silicon nitride, sialon, zirconium phosphate, zirconia, titania and silica ($SiO_2$) may be contained. Among these, for reasons of cost, availability, thermal shock resistance, and peel resistance, the ceramic particles preferably contain 50% by mass or more, more preferably 70% by mass or more, and even more preferably 90% by mass or more in total of one or more selected from silicon carbide, cordierite, alumina, silica, mullite and aluminum titanate. For the reason of thermal shock resistance and peel resistance, the ceramic particles preferably contain 50% by mass or more, more preferably 70% by mass or more, and even more preferably 90% by mass or more of silicon carbide.

Figure 5:
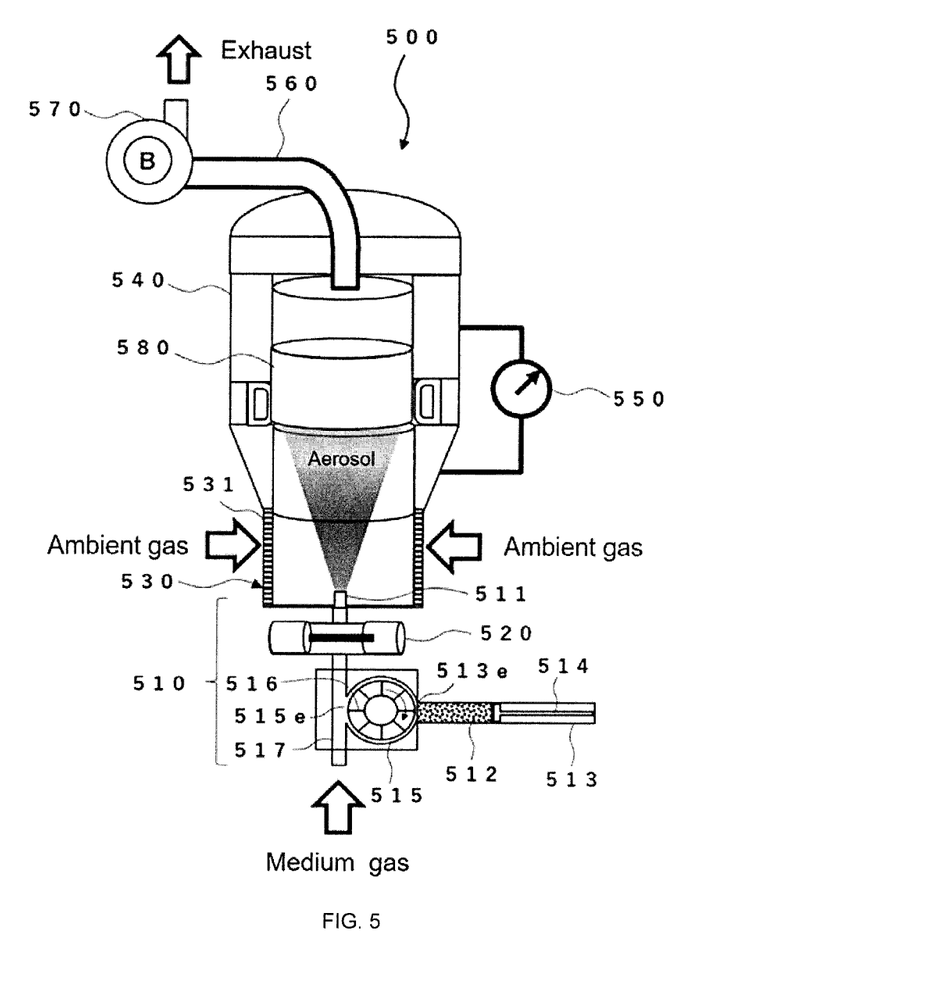

FIG. 5 schematically shows a device configuration of a particle adhering device (500) suitable for carrying out the step of adhering ceramic particles to the surface of the first cells of the pillar-shaped honeycomb structure (580). The particle adhering device (500) comprises an aerosol generator (510), a laser diffraction type particle size distribution measuring device (520), a gas introduction pipe (530), a holder (540), a differential pressure gauge (550), an exhaust pipe (560) and a blower (570).

The aerosol generator (510) comprises:
- a cylinder (513) for storing ceramic particles (512),
- a piston or a screw (514) for sending out ceramic particles (512) stored in the cylinder (513) from a cylinder outlet (513e),
- a crushing chamber (515) communicating with the cylinder outlet (513e) having a rotating body (516) for crushing the ceramic particles (512) sent out from the cylinder outlet (513e), and
- a gas flow path (517) for flowing a medium gas that communicates with the crushing chamber outlet (515e) in the midway and can inject an aerosol containing the medium gas and the ceramic particles (512) from a nozzle (511) attached to the tip.

The aerosol generator (510) can inject aerosol from the nozzle (511). The ceramic particles (512) adjusted to a predetermined particle size distribution are stored in the cylinder (513). The ceramic particles (512) stored in the cylinder (513) are pushed out of the cylinder outlet (513e) by a piston or a screw (514). At this time, the pushing speed can be configured to be adjustable. The ceramic particles (512) discharged from the cylinder outlet (513e) enter the crushing chamber (515). The ceramic particles (512) introduced into the crushing chamber (515) move in the crushing chamber (515) while being crushed by the rotating body (516), and are discharged from the crushing chamber outlet (515e). As the rotating body (516), for example, a rotating brush can be adopted. The rotating body (516) can be driven by a motor, and its rotation speed can be configured to be controllable.

The ceramic particles discharged from the crushing chamber outlet (515e) are mixed with the medium gas flowing through the gas flow path (517) to form an aerosol, which is injected from the nozzle (511). The nozzle (511) is preferably installed at a position and direction such that the aerosol is injected in a direction perpendicular to the inlet side end surface toward the center of the inlet side end surface of the pillar-shaped honeycomb structure (580) which is held by the holder (540).

The injection flow rate from the nozzle (511) can be controlled by using a compressed gas such as compressed air with adjusted pressure as the medium gas. A laser diffraction type particle size distribution measuring device (520) is installed in the gas flow path (517), and the particle size distribution of ceramic particles in the aerosol discharged from the aerosol generator (510) can be measured in real time. Thereby, it is possible to monitor whether or not the ceramic particles supplied to the pillar-shaped honeycomb structure (580) have a desired particle size distribution.

Fine ceramic particles have the property of easily aggregating. However, by using the aerosol generator (510) according to the present embodiment, the crushed ceramic particles are injected, so that ceramic particles having a particle size distribution as intended in which aggregation is suppressed can be adhered to the surface of the first cells.

The aerosol injected from the aerosol generator (510) passes through the gas introduction pipe (530) by the suction force from the blower (570), and then is sucked into the first cells of the pillar-shaped honeycomb structure filter from the inlet side end surface of the pillar-shaped honeycomb structure which is held by the holder (540). The ceramic particles in the aerosol sucked into the first cells adhere to the surface of the first cells.

A plurality of ventilation holes (531) is provided on the wall surface of the gas introduction pipe (530), and it is possible to suck in ambient gas such as air. Thereby, the gas flow rate flowing into the gas introduction pipe (530) can be adjusted according to the suction force from the blower (570). A filter may be installed in the ventilation holes (531) for the reason of preventing foreign substance from entering.

An exhaust pipe (560) connected to the blower (570) is provided on the downstream side of the outlet side end surface of the pillar-shaped honeycomb structure (580). Therefore, after the aerosol from which the ceramic particles have been removed is discharged from the outlet side end surface of the pillar-shaped honeycomb structure (580), it passes through the exhaust pipe (560) and then is exhausted through the blower (570).

When the step of adhering the ceramic particles to the surface of the first cells is continued, the pressure loss between the inlet side end surface and the outlet side end surface of the pillar-shaped honeycomb structure increases as the amount of the ceramic particles adhered increases. By obtaining the relationship between the adhesion amount of ceramic particles and the pressure loss in advance, the end point of the step of adhering the ceramic particles to the surface of the first cells can be determined based on the pressure loss. Therefore, the particle adhering device (500) can be provided with a differential pressure gauge (550) to measure the pressure loss between the inlet side end surface and the outlet side end surface of the pillar-shaped honeycomb structure (580), and the end point of the process may be determined based on the indication of the differential pressure gauge.

When the step of adhering the ceramic particles to the surface of the first cells is carried out, the ceramic particles adhere to the inlet side end surface of the pillar-shaped honeycomb structure (580). Therefore, it is preferable to remove the ceramic particles by suction with a vacuum or the like while leveling the inlet side end surface with a jig such as a scraper.

After that, the pillar-shaped honeycomb structure in which the ceramic particles are adhered to the surface of the first cells is subject to heat treatment under a condition of keeping it at a maximum temperature of 1000° C. or higher for 1 hour or longer, typically a condition of keeping it at a maximum temperature of 1100 to 1400° C. for 1 to 6 hours to complete the pillar-shaped honeycomb structure filter. The heat treatment can be carried out by placing the pillar-shaped honeycomb structure in, for example, a continuous firing furnace (for example, a tunnel kiln or the like) or a batch firing furnace (for example, a shuttle kiln or the like). In the heat treatment, the average temperature rising rate at the time of temperature rising from room temperature (25° C.) to the maximum temperature is preferably 100° C./Hr or more for the reason of increasing the production rate. Further, in the heat treatment, the average temperature rising rate at the time of temperature rising from room temperature (25° C.) to the maximum temperature is preferably 200° C./Hr or less for the reason of suppressing occurrence of cracks. In addition, the average temperature dropping rate at the time of temperature dropping from the maximum temperature to room temperature (25° C.) is preferably 200° C./Hr or less for the reason of suppressing occurrence of cracks and reducing the burden on the kiln material. By the heat treatment, the ceramic particles are bonded to each other, and the ceramic particles are baked on the partition walls in the first cells to form a porous film on the surface of the first cells. When the heat treatment is carried out under oxygen-containing conditions such as air, a surface oxide film is formed on the surface of the ceramic particles and the bonding between the ceramic particles is promoted. As a result, a porous film that is difficult to peel off can be obtained.

The average film thickness T (unit: μm) of the porous film formed on the surface of the first cells by the heat treatment and D50 (unit: μm) of the ceramic particles preferably satisfy a relational expression 4×D50≤T≤20×D50. The relational expression indicates that when D50 is small, it would be better that the average film thickness T is small, and when D50 is large, it would be better that the average film thickness T is large. This is because the smaller D50 leads to the narrower exhaust gas flow path of the porous film, which improves the collection efficiency.

Examples

Hereinafter, examples for better understanding the present invention and its advantages will be described, but the present invention is not limited to the examples.

(1) Manufacture of Pillar-Shaped Honeycomb Structure Filter

To 100 parts by mass of the cordierite-forming raw material, 3 parts by mass of pore-forming material, 55 parts by mass of dispersion medium, 6 parts by mass of organic binder, and 1 part by mass of dispersant were added, mixed and kneaded to prepare a green body. Alumina, aluminum hydroxide, kaolin, talc, and silica were used as the cordierite-forming raw material. Water was used as the dispersion medium, a water-absorbing polymer was used as the pore-forming material, hydroxypropylmethyl cellulose was used as the organic binder, and fatty acid soap was used as the dispersant.

This green body was put into an extrusion molding machine and extruded through a die having a predetermined shape to obtain a cylindrical honeycomb formed body. The obtained honeycomb formed body was subject to dielectric drying and hot air drying, and then both end surfaces were cut so as to have predetermined dimensions to obtain a honeycomb dried body.

The obtained honeycomb dried body was sealed with cordierite as a material so that the first cells and the second cells were alternately arranged adjacent to each other. Then it was degreased by heating at about 200° C. in an air atmosphere, and further fired at 1420° C. for 5 hours in an air atmosphere to obtain a pillar-shaped honeycomb structure.

The specifications of the pillar-shaped honeycomb structure were as follows.
  Overall shape: cylindrical shape with a diameter of 132 mm and a height of 120 mm
  Cell shape in cross-section perpendicular to the cell flow path direction: square
  Cell density (number of cells per unit cross-section area): 200 cpsi
  Average pore diameter 9 μm
  Porosity 55%
  Partition wall thickness: 8 mil (200 μm) (nominal value based on the die specifications)

Ceramic particles were adhered to the surface of the first cells of the pillar-shaped honeycomb structure prepared as above by using the particle adhering device having the configuration shown in FIG. 5. The operating conditions of the particle adhering device were as follows.
  Aerosol generator: RBG2000 available from PALAS
  Ceramic particles stored in the cylinder: Listed in Table 1 (in the table, "main raw material" means that the indicated substance occupies 90% by mass or more). (The particle size distribution of the ceramic particles stored in the cylinder was changed according to the test number.)
  Medium gas: dry air
  Ambient gas: air atmosphere
  Average flow rate of aerosol flowing in the pillar-shaped honeycomb structure: 3000 L/Min
  Laser diffraction type particle size distribution measuring device: Insitec Spray available from MALVERN The particle size distribution of the ceramic particles discharged via the aerosol was measured with the laser diffraction type particle size distribution measuring device during the operation of the particle adhering device, and D50 and D50/(D90−D10) were measured. The results are shown in Table 1. From this result, it was confirmed that in each of the Examples and Comparative Examples, the particle size distribution of the ceramic particles stored in the cylinder was substantially the same, and no aggregation occurred.

For the obtained pillar-shaped honeycomb structure to which the ceramic particles adhered, the ceramic particles adhering to the inlet side end surface were sucked and removed by vacuum while the inlet side end surface was leveled with a scraper. After that, the pillar-shaped honeycomb structure was placed in a batch-type electric furnace and heat-treated in an air atmosphere under the condition of keeping it at a maximum temperature of 1200° C. for 2 hours to form a porous film on the surface of the first cells, and thereby obtaining a pillar-shaped honeycomb structure filter. During the heat oxidation treatment, in all the test examples, at the time of temperature rising, the average temperature rising rate from room temperature (25° C.) to the maximum temperature was set to 100° C./Hr, and at the time of temperature dropping, the average temperature dropping rate from the maximum temperature to room temperature (25° C.) was set to 100° C./Hr. In addition, the pillar-shaped honeycomb structure filters were prepared as many as necessary for carrying out the following characteristic evaluation.

(2) Characteristic Evaluation

[Film Weight]

The weight of the porous film of each pillar-shaped honeycomb structure filter obtained by the above manufacturing method was measured. Specifically, the value obtained by subtracting the weight of the pillar-shaped honeycomb structure before the ceramic particles were adhered thereto from the weight of the pillar-shaped honeycomb structure filter was defined as the film weight. The results are shown in Table 1.

[Average Film Thickness]

The average film thickness of the porous film of each pillar-shaped honeycomb structure filter obtained by the above manufacturing method was measured by the method described above. The 3D shape measuring machine used for the measurement was VR-3200 available from KEYENCE CORPORATION. The results are shown in Table 1.

[Film Porosity]

Figure 8:
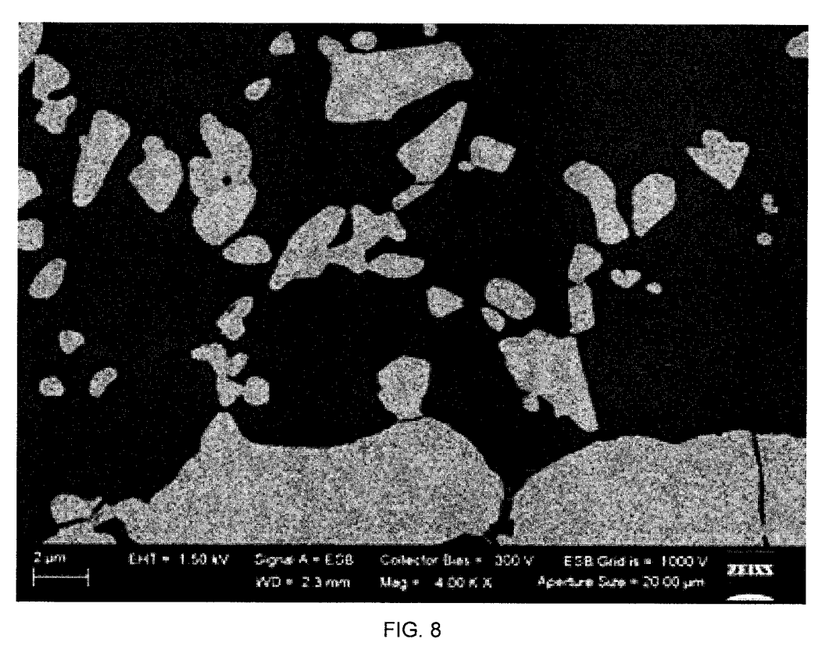

The porosity of the porous film was measured by the method described above. The devices used for the measurement were an FE-SEM (model: ULTRA55 (available from ZEISS)) and an image analysis software HALCON. The results are shown in Table 1. An FE-SEM image of the porous film in Example 2 is illustrated in FIG. 8. The gray part is the film material part, and the black part is the void part.

The "collection efficiency (%)" and "pressure loss" of each pillar-shaped honeycomb structure filter obtained by the above manufacturing method were measured by the following procedures.

[Collection Efficiency (%)]

The pillar-shaped honeycomb structure filter was connected to the outlet side of the engine exhaust manifold of a 1.2 L direct injection gasoline engine vehicle, and the number of soot contained in the gas discharged from the outlet of the pillar-shaped honeycomb structure filter was measured by a PN measurement method. As for the running mode, a running mode (RTS95) simulating the worst of RDE running was carried out. The cumulative number of soot particles discharged after running in the mode was taken as the number of soot particles from the exhaust gas purification device to be evaluated, and the collection efficiency (%) was calculated from the number of soot particles. The results are shown in Table 1.

[Pressure Loss]

The exhaust gas discharged from a 1.2 L direct injection gasoline engine was introduced at a flow rate of 600 m³/h at 700° C., and the pressures on the inlet side and the outlet side of the pillar-shaped honeycomb structure filter were measured. Then, the pressure loss (kPa) of the honeycomb filter was obtained by calculating the pressure difference between the inlet side and the outlet side. The results are shown in Table 1.

understood that a porous film in which the average film thickness T and the porosity P satisfy the predetermined conditions can achieve both a high PN collection efficiency and a low-pressure loss. Further, as can be seen from Table 1 and FIG. 7, it can be understood that when D50, D50/(D90−D10), and the average film thickness T satisfy the predetermined conditions, a porous film capable of achieving both a high PN collection efficiency and a low-pressure loss can be obtained.

DESCRIPTION OF REFERENCE NUMERALS

100 Pillar-shaped honeycomb structure filter
102 Outer peripheral side wall
104 Inlet side end surface
106 Outlet side end surface
108 First cell
109 Sealing portion
110 Second cell
112 Partition wall
114 Porous film
500 Particle adhering Device
510 Aerosol generator
511 Nozzle
512 Ceramic particles
513 Cylinder
513e Cylinder outlet
514 Piston or screw
515 Crushing chamber
515e Crushing chamber outlet
516 Rotating body

TABLE 1

| Unit | Ceramic particles Main raw material (−) | Ceramic particle size distribution in aerosol D50 (μm) | Ceramic particle size distribution in aerosol (D90 − D10) (−) | Porous film Film weight (g) | Porous film Average film thickness [μm] | Porous film Film porosity [%] | Product performance Collection efficiency [%] | Product performance Pressure loss [kPa] |
|---|---|---|---|---|---|---|---|---|
| Example 1 | SiC | 3.1 | 1.0 | 10 | 26 | 76 | 94 | 3.4 |
| Example 2 | SiC | 2.4 | 0.7 | 10 | 21 | 81 | 93 | 3.3 |
| Example 3 | SiC | 0.4 | 0.4 | 4 | 7 | 70 | 92 | 3.2 |
| Example 4 | SiC | 2.4 | 0.7 | 16 | 44 | 80 | 93 | 3.8 |
| Example 5 | SiC | 2.4 | 0.7 | 4 | 14 | 76 | 89 | 3.2 |
| Example 6 | SiC | 0.4 | 0.4 | 4 | 4 | 73 | 88 | 3.0 |
| Example 7 | Cordierite | 4.2 | 0.4 | 7 | 19 | 86 | 91 | 3.1 |
| Example 8 | Cordierite | 2.4 | 0.8 | 5 | 14 | 80 | 94 | 3.3 |
| Example 9 | Cordierite | 0.3 | 1.2 | 2 | 3 | 69 | 97 | 3.4 |
| Example 10 | SiO$_2$ | 1.6 | 0.5 | 11 | 27 | 71 | 91 | 3.4 |
| Example 11 | Alumina | 3.2 | 0.6 | 10 | 18 | 78 | 90 | 3.2 |
| Example 12 | Mullite | 4.5 | 0.7 | 10 | 25 | 84 | 93 | 3.4 |
| Comparative Example 1 | SiC | 1.7 | 0.3 | 10 | 12 | 60 | 93 | 4.2 |
| Comparative Example 2 | SiC | 2.4 | 0.7 | 2 | 7 | 80 | 72 | 3.0 |
| Comparative Example 3 | SiC | 2.4 | 0.7 | 20 | 53 | 77 | 95 | 4.5 |

(3) Discussion

Figure 6:
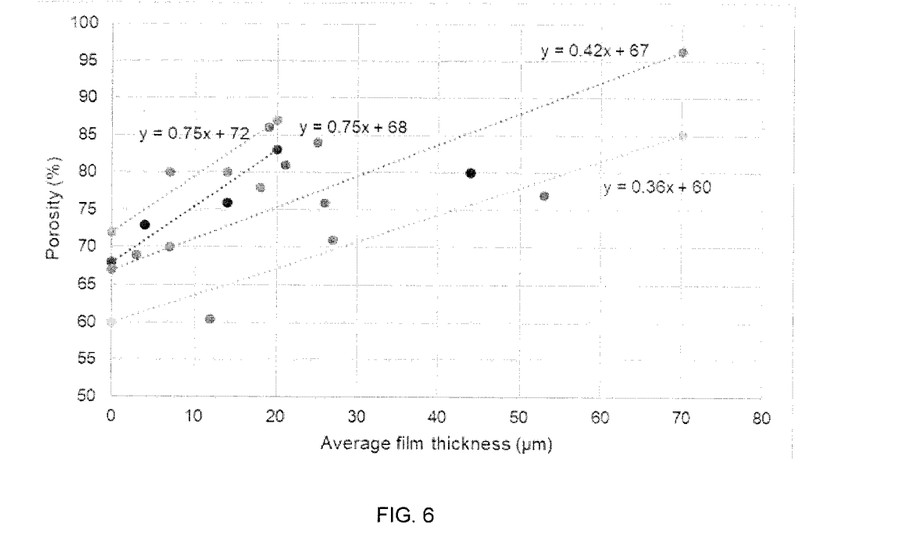
Figure 7:
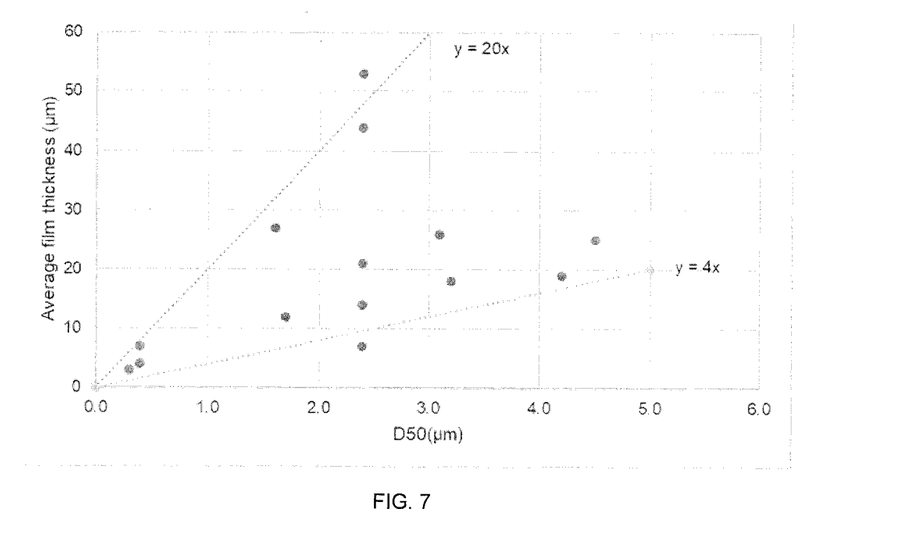

FIG. 6 shows the relationship between the average film thickness and the porosity of the porous film in Examples and Comparative Examples. Further, FIG. 7 shows the relationship between the median diameter (D50) of the ceramic particles in the aerosol and the average film thickness of the porous film in Examples and Comparative Examples. As can be seen from Table 1 and FIG. 6, it can be 517 Gas flow path
520 Laser diffraction type particle size distribution measuring device
530 Gas introduction pipe
531 Ventilation hole
540 Holder
550 Differential pressure gauge
560 Exhaust pipe 570 Blower
580 Pillar-shaped honeycomb structure

The invention claimed is:

1. A pillar-shaped honeycomb structure filter, comprising: a plurality of first cells extending from an inlet side end surface to an outlet side end surface, opening on the inlet side end surface and having a sealing portion on the outlet side end surface; and a plurality of second cells extending from the inlet side end surface to the outlet side end surface, having a sealing portion on the inlet side end surface and opening on the outlet side end surface, the first cells and the second cells being alternately arranged adjacent to each other with a porous partition wall interposed therebetween;

wherein a ceramic porous film, in which an average film thickness T is 2 to 50 m, a porosity P is 65 to 90%, and the average film thickness T and the porosity P satisfy a relational expression of $0.42\,T+67 \leq P \leq 0.75\,T+72$, is formed on a surface of each of the first cells, wherein the porous film is formed on the surface of the first cells after the pillar-shaped honeycomb structure has undergone a firing step, wherein a thickness of the porous partition wall is 0.26 mm or less; and wherein the porous partition wall comprises 50% by mass or more of cordierite.

2. The pillar-shaped honeycomb structure filter according to claim 1, wherein the ceramic porous film has the average film thickness T of 2 to 40 μm and the porosity P of 65 to 90%.

3. The pillar-shaped honeycomb structure filter according to claim 1, wherein the ceramic porous film comprises 50% by mass or more in total of one or more selected from the group consisting of silicon carbide, cordierite, alumina, silica, mullite and aluminum titanate.

4. A method for manufacturing the pillar-shaped honeycomb structure filter according to claim 1, comprising:

a step of preparing a pillar-shaped honeycomb structure comprising a plurality of first cells extending from an inlet side end surface to an outlet side end surface, opening on the inlet side end surface and having a sealing portion on the outlet side end surface, and a plurality of second cells extending from the inlet side end surface to the outlet side end surface, having a sealing portion on the inlet side end surface and opening on the outlet side end surface, the first cells and the second cells being alternately arranged adjacent to each other with a porous partition wall interposed therebetween;

a step of adhering ceramic particles to a surface of the first cells by injecting an aerosol containing the ceramic particles toward the inlet side end surface while applying a suction force to the outlet side end surface to suck the injected aerosol from the inlet side end surface, the ceramic particles satisfying $0.1 \leq D50 \leq 6.0$ and a relational expression of $0.4 \leq D50/(D90-D10)$, wherein D50 (unit: μm) is a median diameter, D10 (unit: μm) is a 10% diameter, and D90 (unit: μm) is a 90% diameter in a volume-based cumulative particle size distribution measured by a laser diffraction/scattering method; and a step of forming a porous film on the surface of the first cells by heat-treating the pillar-shaped honeycomb structure in which the ceramic particles are adhered to the surface of the first cells at a maximum temperature of 1000° C. or higher for 1 hour or more so that an average film thickness T and D50 satisfy a relational expression of $4 \times D50 \leq T \leq 20 \times D50$.

5. The method for manufacturing a pillar-shaped honeycomb structure filter according to claim 4, wherein the porous film comprises 50% by mass or more in total of one or more selected from silicon carbide, cordierite, alumina, silica, mullite and aluminum titanate.

6. The pillar-shaped honeycomb structure filter according to claim 1, wherein the porosity P of the ceramic porous film is 81 to 90%.

7. The pillar-shaped honeycomb structure filter according to claim 1, wherein the pillar-shaped honeycomb structure has a cell density of 6 to 2000 cells/square inch.

* * * * *